US012585389B2

(12) United States Patent　　　(10) Patent No.:　US 12,585,389 B2
Hubbard et al.　　　　　　　　　(45) Date of Patent:　　Mar. 24, 2026

(54) BALANCING WEAR ACROSS MULTIPLE RECLAIM GROUPS

(71) Applicant: Micron Technology, Inc., Boise, ID (US)

(72) Inventors: Daniel J. Hubbard, Boise, ID (US); Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/747,582

(22) Filed: Jun. 19, 2024

(65) Prior Publication Data

US 2025/0013368 A1　　Jan. 9, 2025

Related U.S. Application Data

(60) Provisional application No. 63/525,181, filed on Jul. 6, 2023.

(51) Int. Cl.
　　G06F 3/06　　　　　(2006.01)
(52) U.S. Cl.
　　CPC ............ G06F 3/0616 (2013.01); G06F 3/061 (2013.01); G06F 3/0659 (2013.01); G06F 3/0679 (2013.01)
(58) Field of Classification Search
　　CPC ...... G06F 3/0616; G06F 3/061; G06F 3/0659; G06F 3/0679; G06F 2212/1036;
　　　　　　(Continued)

(56) References Cited

U.S. PATENT DOCUMENTS

| | | | |
|---|---|---|---|
| 2017/0017588 A1* | 1/2017 | Frid | ........................ G06F 3/061 |
| 2018/0143762 A1 | 5/2018 | Kim et al. | |

(Continued)

FOREIGN PATENT DOCUMENTS

| | | |
|---|---|---|
| KR | 102053865 | 12/2019 |
| KR | 102225525 | 3/2021 |
| WO | WO-2025019565 A1 | 1/2025 |

OTHER PUBLICATIONS

"International Application Serial No. PCT US2024 034616, International Search Report mailed Sep. 30, 2024", 3 pages.

(Continued)

*Primary Examiner* — Hosain T Alam
*Assistant Examiner* — Zubair Ahmed
(74) *Attorney, Agent, or Firm* — Schwegman Lundberg & Woessner, P.A.

(57)　　　　　ABSTRACT

Aspects of the present disclosure configure a memory subsystem controller to balance program-erase count (PEC) across multiple reclaim groups of a memory sub-system. The controller groups a set of memory components into a plurality of reclaim groups (RGs), each RG of the plurality of RGs comprising a subset of reclaim units (RUs). The controller receives a request to program a set of data into a first RG of the plurality of RGs and compares a first PEC of the first RG with a second PEC of a second RG of the plurality of RGs. The controller performs wear leveling operations for the set of data requested to be programmed into the first RG using one or more memory components associated with the second RG based on a result of comparing the first PEC of the first RG with the second PEC of the second RG.

19 Claims, 7 Drawing Sheets

(58) Field of Classification Search
CPC .......... G06F 2212/7208; G06F 3/0688; G06F 12/0246; G06F 2212/7211
USPC .................................................. 711/154, 100
See application file for complete search history.

(56) References Cited

U.S. PATENT DOCUMENTS

| | | | |
|---|---|---|---|
| 2019/0146911 A1 | 5/2019 | Ha et al. | |
| 2020/0334145 A1 | 10/2020 | Yoshii et al. | |
| 2021/0096772 A1 | 4/2021 | Lee | |
| 2021/0216239 A1 | 7/2021 | Dutta et al. | |
| 2022/0050627 A1 | 2/2022 | Pratt | |
| 2022/0107754 A1* | 4/2022 | Li | G06F 3/0679 |
| 2022/0114092 A1 | 4/2022 | Lengauer | |
| 2022/0147392 A1 | 5/2022 | Choi et al. | |
| 2023/0161697 A1 | 5/2023 | Kale et al. | |
| 2023/0251788 A1* | 8/2023 | Bordia | G06F 3/064 711/154 |
| 2025/0007918 A1 | 1/2025 | Helmick et al. | |
| 2025/0028483 A1 | 1/2025 | Hubbard et al. | |

OTHER PUBLICATIONS

"International Application Serial No. PCT US2024 034616, Written Opinion mailed Sep. 30, 2024", 3 pages.
"International Application Serial No. PCT US2024 038348, International Search Report mailed Oct. 24, 2024", 3 pages.
"International Application Serial No. PCT US2024 038348, Written Opinion mailed Oct. 24, 2024", 3 pages.
U.S. Appl. No. 18/775,754, filed Jul. 17, 2024, Preemptively Warning Host of Background Folding.

* cited by examiner

MEDIA OPERATIONS MANAGER — 200

CONFIGURATION DATA — 220

WEAR MANAGEMENT COMPONENT — 230

RG MANAGEMENT COMPONENT — 240

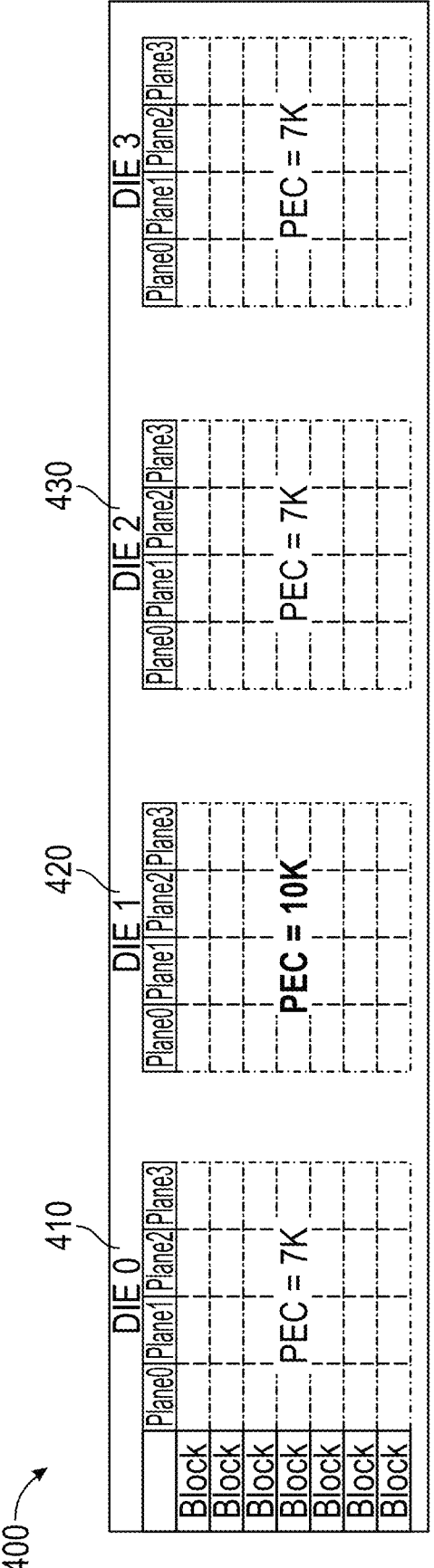
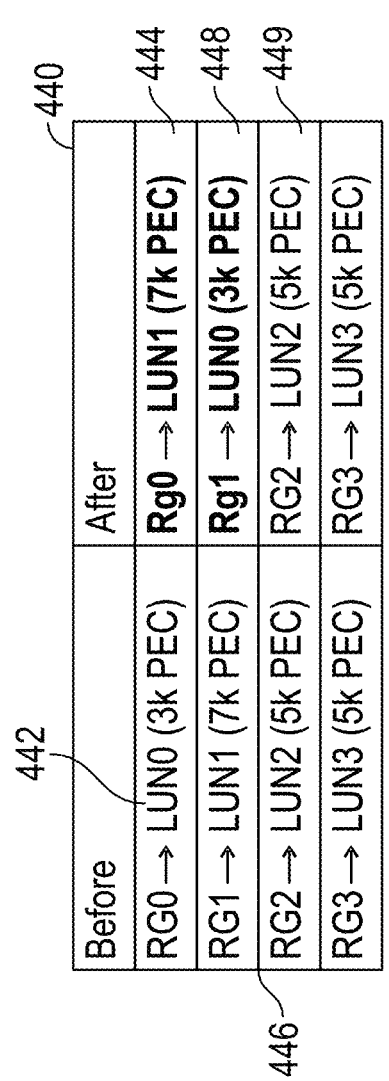
*FIG. 4*

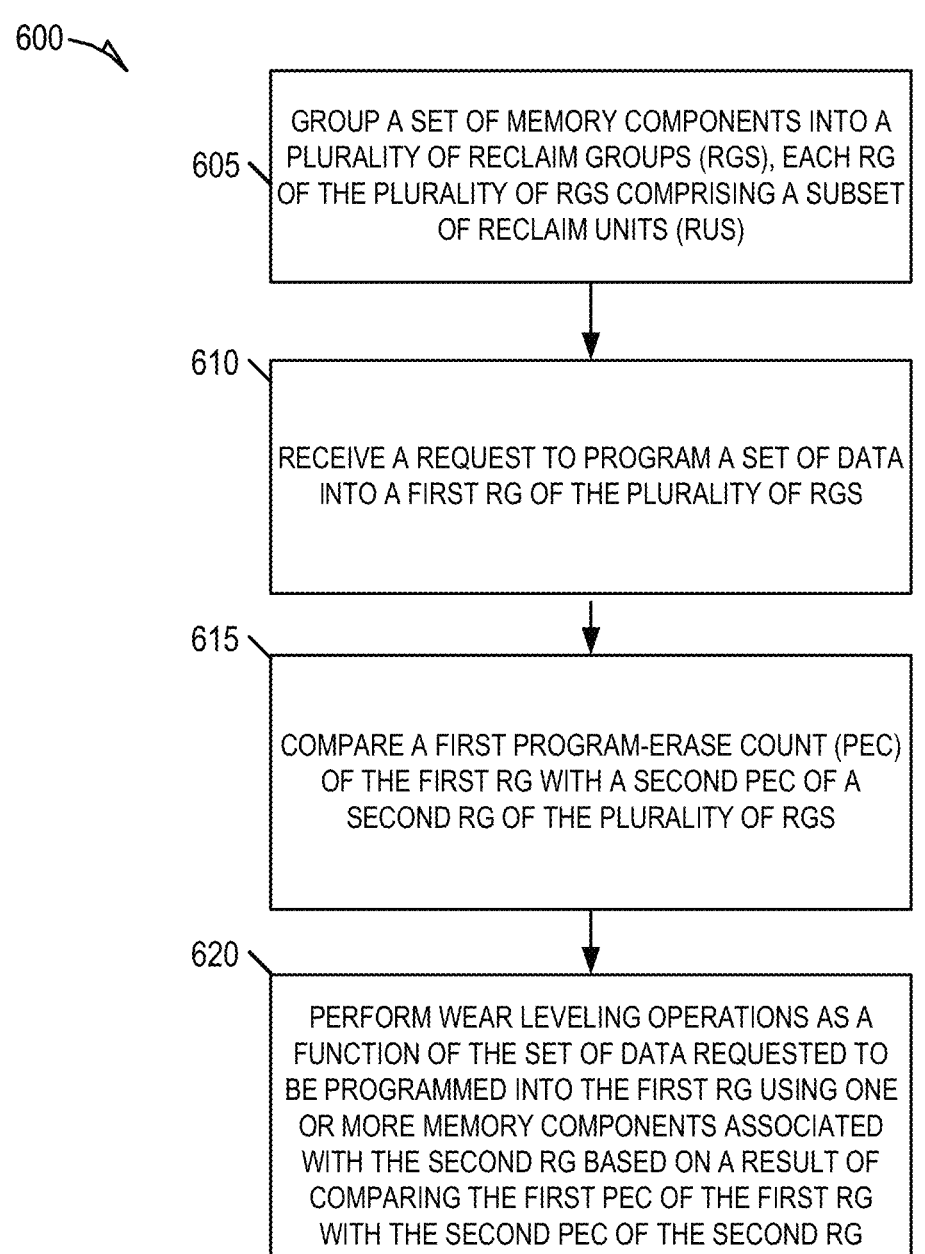

600

605 — GROUP A SET OF MEMORY COMPONENTS INTO A PLURALITY OF RECLAIM GROUPS (RGS), EACH RG OF THE PLURALITY OF RGS COMPRISING A SUBSET OF RECLAIM UNITS (RUS)

610 — RECEIVE A REQUEST TO PROGRAM A SET OF DATA INTO A FIRST RG OF THE PLURALITY OF RGS

615 — COMPARE A FIRST PROGRAM-ERASE COUNT (PEC) OF THE FIRST RG WITH A SECOND PEC OF A SECOND RG OF THE PLURALITY OF RGS

620 — PERFORM WEAR LEVELING OPERATIONS AS A FUNCTION OF THE SET OF DATA REQUESTED TO BE PROGRAMMED INTO THE FIRST RG USING ONE OR MORE MEMORY COMPONENTS ASSOCIATED WITH THE SECOND RG BASED ON A RESULT OF COMPARING THE FIRST PEC OF THE FIRST RG WITH THE SECOND PEC OF THE SECOND RG

*FIG. 6*

BALANCING WEAR ACROSS MULTIPLE RECLAIM GROUPS

PRIORITY APPLICATION

This application claims the benefit of priority to U.S. Provisional Application Ser. No. 63/525,181, filed Jul. 6, 2023, which is incorporated herein by reference in its entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components. Some memory sub-systems arrange their memory components into reclaim groups (RGs), each of which includes sets of reclaim units (RUS). Such memory sub-systems enable a host to control the physical location (e.g., by RG and/or RU) into which data is programmed.

BRIEF DESCRIPTION OF THE DRAWINGS

The present disclosure will be understood more fully from the detailed description given below and from the accompanying drawings of various embodiments of the disclosure.

FIGS. 4 and 5 are block diagrams of examples of RG wear leveling operations, in accordance with some implementations of the present disclosure.

FIG. 6 is a flow diagram of an example method to perform RG balancing (wear leveling), in accordance with some implementations of the present disclosure.

DETAILED DESCRIPTION

Figure 1:
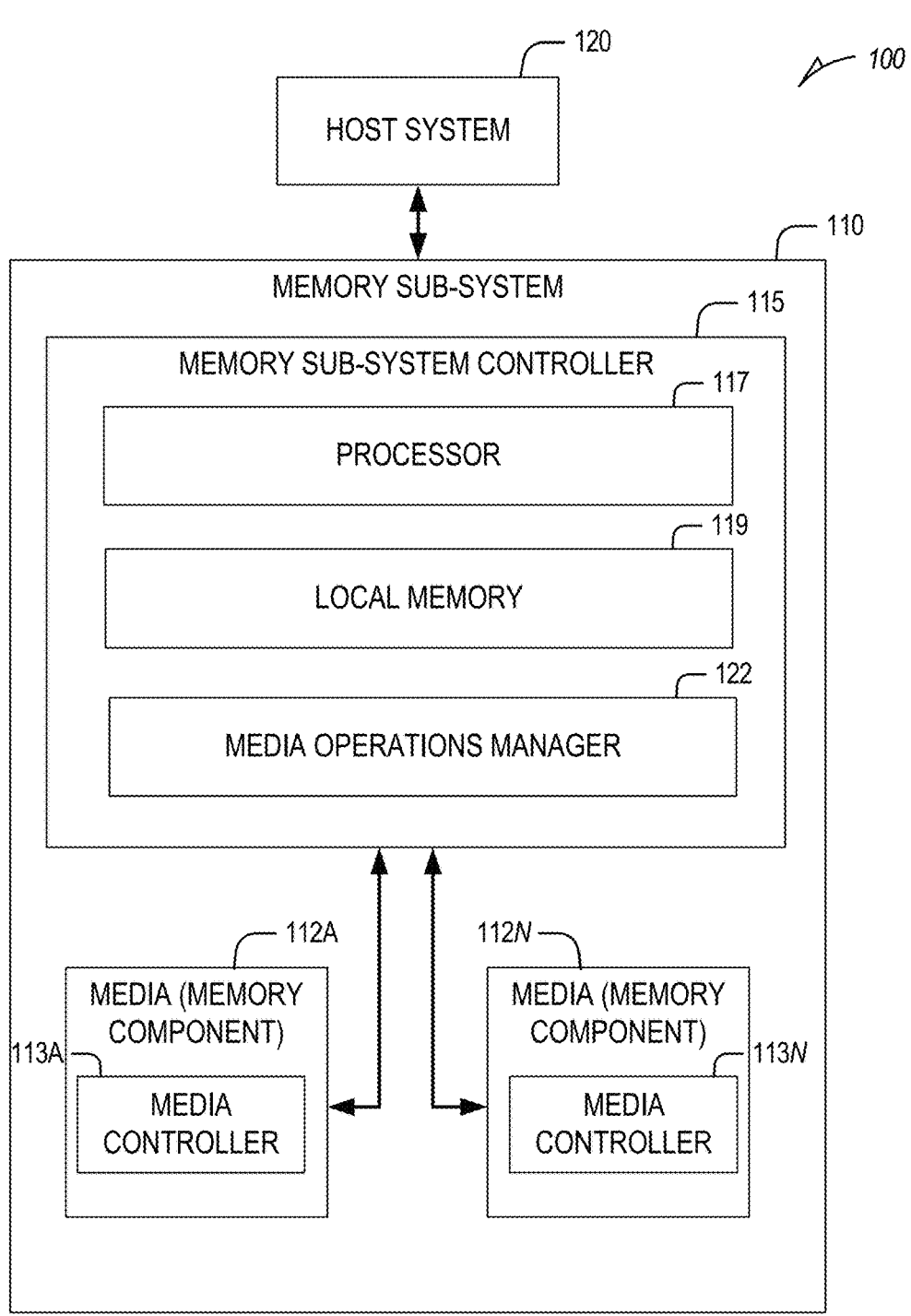
FIG. 1 is a block diagram illustrating an example computing environment including a memory sub-system, in accordance with some embodiments of the present disclosure.

Aspects of the present disclosure configure a system component, such as a memory sub-system controller, to perform program-erase count (PEC) and/or wear leveling operations. The memory sub-system controller can compare wear and/or PEC of different RGs of the memory sub-system to selectively control performing wear leveling operations. Based on the PEC and/or wear of different RG, the memory sub-system controller can selectively distribute memory operations across the memory components so that data is programmed using different physical memory components than those initially assigned or associated with an individual RG that is the subject of a request to program data. This ensures that performance of the memory system remains optimal by increasing the current PECs of different memory components at different rates until the PECs of the memory components reach a balance (e.g., are equal to each other or correspond to a target PEC). At that point, the different components can be programmed according to the default or previous assignments. This improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data". In some cases, the memory sub-system includes an optional feature, such as a Flexible Data Placement (FDP) feature that defines RG and RUs. This protocol enables remote hosts to control data storage on the memory sub-systems over a network.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, certain memory devices, such as NAND flash devices, include large die-by-die reliability (RWB) variation. As the technology for such memory devices continues to be scaled down, this die-by-die reliability variation becomes more pronounced and problematic in performing memory management. Current memory systems (e.g., SSD drive or die package systems) associate all of the memory devices or memory dies in the memory system with a certain reliability specification. In some cases, each block of each memory device is associated with a reliability grade or specification which is used to determine whether the block is a good block or a bad block. Good blocks are those that have reliability grades above a reliability threshold and bad blocks are blocks that have reliability grades below a reliability threshold. The reliability grades can be set at manufacture or during operation of the memory devices, such as by measuring the data retention and/or error rate associated with particular blocks.

Certain memory systems group the physical memory components into different RG where each RG includes multiple RUs. The RUs can be of any size that is at least as large as the LUN. Namely, the RU can be the size of a single block or can be the size of a superblock spanning multiple memory dies. These memory systems allow hosts to store data to certain RG and/or to certain RUs within those RGs. This provides greater control to the host as to where data is physically stored. Once data is stored to an individual RG, garbage collection operations can be performed but are limited to folding data using the RUs of the individual RG. Namely, data cannot be folded into any RU or another RG but all remains stored in the same RG.

While allowing host devices to control where data is physically stored provides additional flexibility, such processes also introduce inefficiencies in data storage. For example, a first RG may be used or go through a significantly larger quantity of PEC than a second RG making the first RG have higher wear than the second RG. The lack of control and distribution of data programming equally across the memory components creates an imbalance of wear or PEC across the memory components of the memory system. This can result in certain memory components reaching their end of life sooner than expected, which can degrade the memory performance and efficiency. Also, the reliability of the memory components may no longer comport with the expected or manufactured reliability measures, which creates instability in the memory system reducing its reliability. This flexibility adds to the wear leveling concern, which means the P/E cycle between die to die can vary significantly. This variability needs to be well mitigated by drive firmware since the die-to-die wear range may cause certain high-wearing die(s) to be phased out of the system too soon due to reliability issue in EOL (End Of Life), at which point the previously stored data would be no longer be recoverable.

Aspects of the present disclosure address the above and other deficiencies by providing a memory controller that can balance the PEC and/or wear across different RGs. This ensures that the different memory components reach a target PEC at the same time rather than the lifetime PEC of one set of components being depleted or reached before the lifetime PEC of another set of components. This ensures that performance of the memory system remains optimal by increasing current PECs of different memory components at different rates until the PECs of the memory components reach a balance (e.g., are equal to each other or correspond to a target PEC). This improves the overall efficiency of operating the memory sub-system.

In some examples, the memory controller balances the PEC and/or wear across the different RGs by modifying the assignment between memory components and RGs (e.g., changing the grouping). For example, the memory controller can associate a first RG that is currently associated with a first set of memory components with a different set of memory components of a second RG that is associated with lower wear than the first RG. In some examples, the memory controller can increase the size of the RU of an individual RG that has a certain wear level by borrowing or using a portion of one or more RUs of one or more other RGs. This can reduce the rate at which the individual RG undergoes P/E cycles because of the larger RU size while increasing the rate at which the other RGs undergo P/E cycles because of the smaller RU size. In this way, the wear is distributed more efficiently and effectively across the various RGs.

For example, the memory controller can group a set of memory components into a plurality of RGs, each RG of the plurality of RGs comprising a subset of RUs. The memory controller can receive a request to program a set of data into a first RG of the plurality of RGs and compares a first program-erase count (PEC) of the first RG with a second PEC of a second RG of the plurality of RGs. The memory controller can perform wear leveling operations as a function of the set of data requested to be programmed into the first RG using one or more memory components associated with the second RG based on a result of comparing the first PEC of the first RG with the second PEC of the second RG.

In some cases, the memory controller maintains a table that stores a current PEC of each of the plurality of RGs, the first PEC being stored in the table in association with the first RG and the second PEC being stored in the table in association with the second RG. In some cases, the wear leveling operations include programming the set of data requested to be programmed into the first RG into the one or more memory components associated with the second RG.

In some examples, the memory controller regroups at least a portion of the set of memory components based on the result of comparing the first PEC of the first RG with the second PEC of the second RG. In some cases, the memory controller determines that a first group of the set of memory components is associated with the first RG and determines that a second group of the set of memory components is associated with the second RG. The memory controller modifies association between the first group of the set of memory components and the first RG to associate the second group of the set of memory components with the first RG.

In some examples, the memory controller modifies association between the second group of the set of memory components and the second RG to associate the first group of the set of memory components with the second RG. The memory controller maintains association between a third group of the set of memory components with a third RG of the plurality of RGs. In some cases, the memory controller programs the set of data requested to be programmed into the first RG into the second group of the set of memory components instead of the first group of the set of memory components. In some examples, the memory controller determines that a difference between the first PEC of the first RG and the second PEC of the second RG transgresses a threshold. The memory controller initiates the regrouping of the at least the portion of the set of memory components in response to determining that the difference between the first PEC of the first RG and the second PEC of the second RG transgresses the threshold.

In some examples, the memory controller determines that a first group of the set of memory components associated with the first RG has higher wearing than a second group of the set of memory components associated with the second RG based on the result of comparing the first PEC of the first RG with the second PEC of the second RG. In such cases, the memory controller defines the first RG as a high-wearing RG and the second RG as a low-wearing RG in response to determining that the first group of the set of memory components associated with the first RG has higher wearing than the second group of the set of memory components associated with the second RG. The memory controller enlarges a size of an individual RU of the subset of RUs of the first RG by donating a portion of a second RU of the subset of RUs of the second RG to the individual RU.

In some examples, the individual RU includes a first set of planes of a first die, and the second RU includes a second set of planes of a second die. In such cases, the memory controller associates a block of an individual plane of the second set of planes with the individual RU to increase a quantity of blocks associated with the individual RU. The second RU can include blocks of a subset of the second set of planes that is fewer in quantity as a result of associating the block of the individual plane of the second set of planes with the individual RU.

In some examples, the memory controller, after associating the block of an individual plane of the second set of planes with the individual RU to increase the quantity of blocks associated with the individual RU, determines that wear of the first RG matches wear of the second RG. The memory controller, in response to determining that the wear of the first RG matches the wear of the second RG, reduces the size of the individual RU by re-associating the block of the individual plane with the second RU. In some cases, the memory controller maintains a tracking table that identifies the donated portion of the second RU and removes the donated portion from the tracking table in response to determining that wear of the first RG matches wear of the second RG.

In some examples, the memory controller, while the donated portion of the second RU continues to be donated to the first RG, performs garbage collection operations on the second RG excluding the donated portion and performs garbage collection operations on the first RG including the donated portion of the second RU. In some cases, the garbage collection operations include folding valid data from one or more RUs of the first RG to one or more other RUs of the first RG.

In some examples, the memory controller selects a size of the donated portion of the second RG. The memory controller computes, based on the selected size, a target PEC representing a quantity of PECs needed to complete balancing PEC values of the first RG with the PEC values of the second RG. In some cases, the memory controller maintains a queue of available blocks from the low-wearing RG available for use in expanding RUs of the high-wearing RG. In some cases, each RG is associated with a different die of a plurality of dies of the memory sub-system.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, one of the memory components 112A to 112N can be associated with a first RG and another one of the memory components 112A to 112N can be associated with a second RG. In some cases, a first portion of the memory components 112A to 112N can be associated with a first RU of the first RG and a second portion of the memory components 112A to 112N can be associated with a second RU of the second RG. The memory sub-system 110 can have any number of RGs and any number of RUs within each RG and can, in some cases, can implement the FDP.

In some examples, the first memory component 112A, block, or page of the first memory component 112A, or group of memory components including the first memory component 112A can be associated with a first reliability (capability) grade, value, measure, or lifetime PEC. The terms "reliability grade," "value" and "measure" are used interchangeably throughout and can have the same meaning. The second memory component 112N or group of memory components including the second memory component 112N can be associated with a second reliability (capability) grade, value, measure, or lifetime PEC. In some examples, each memory component 112A to 112N can store respective configuration data that specifies the respective reliability grade and lifetime PEC and current PEC. In some examples, a memory or register can be associated with all of the memory components 112A to 112N and can store a table that maps different groups, bins or sets of the memory components 112A to 112N to respective reliability grades, lifetime PEC values, and/or current PEC values.

In some examples, a memory or register can be associated with all of the memory components 112A to 112N and can store a table that maps portions of the memory components 112A to 112N to different groups of RG. The table can specify which set of memory components 112A to 112N maps to or is associated with and grouped with a first RG and within that set which portions of the memory components 112A to 112N correspond to RUs within the first RG. The table can also store an indication and keep track of the number of PEC of the first RG. Similarly, the table can specify which other set of memory components 112A to 112N maps to or is associated with and grouped with a second RG, and within that set, which portions of the memory components 112A to 112N correspond to RUS within the second RG. The table can also store an indication and keep track of the number of PEC of the second RG. The table can store information that indicates the wear level of each RG (e.g., the number of PE cycles and/or PEC of each RG). Using the table, the media operations manager 122 can dynamically balance the wear level and/or PEC of each RG. For example, the media operations manager 122 can real- locate or regroup the assignments between memory compo- nents 112A to 112N and the respective RGs to reduce the number of PEC counts of one or more memory components 112A to 112N of an individual RG. In some examples, the media operations manager 122 can re-allocate (temporarily) one or more portions of the RU of the second RG to a RU of the first RG to increase the size of the RU of the first RG. This can thereby reduce the PEC or PE cycles the first RG is exposed to while increasing the PE cycles of at least a portion of the second RG.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub- systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an inter- face for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory com- ponents 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in- place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hard- ware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (process- ing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the lifetime PEC values and/or reliability grades associated with different groups of the memory components 112N to 112N and/or different blocks within each of the memory components 112N to 112N. In some examples, commands or operations received from the host system 120 can include a write command which can specify or identify an individual RG and/or RU within the individual RG to which to program data. Based on the individual RG specified by the write command, the memory sub-system controller 115 can determine the memory components 112A to 112N associated with the individual RG and can generate a write pointer that is used to program the data to the determined memory components 112A to 112N.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to balance the PEC and/or wear across different memory components 112A to 112N (e.g., RGs). This ensures that the different memory components 112A to 112N wear or are used at the same rate (e.g., reach a target PEC at the same time) rather than the lifetime PEC of one set of components 112A, associated with one RG, being depleted or reached before the lifetime PEC of another set of components 112N, associated with another RG. This ensures that performance of the memory system remains optimal by balancing PECs and/or wear of different memory components 112A to 112N at similar rates. This improves the overall efficiency of operating the memory sub-system 110.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
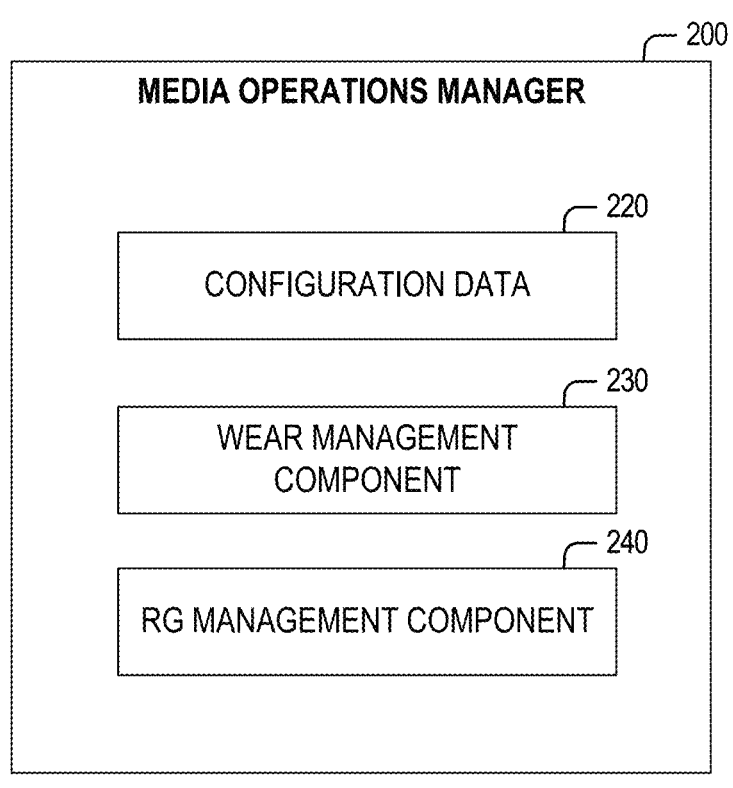
FIG. 2 is a block diagram of an example media operations manager, in accordance with some implementations of the present disclosure.

FIG. 2 is a block diagram of an example media operations manager 200 (corresponding to media operations manager 122), in accordance with some implementations of the present disclosure. As illustrated, the media operations manager 200 includes configuration data 220, a wear management component 230, and an RG management component 240. For some embodiments, the media operations manager 200 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 200. For example, the media operations manager 200 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including lifetime PEC values of different bins, groups, blocks, block stripes, memory dies and/or sets of the memory components 112A to 112N, and/or group assignments that define the sizes of different RU and RGs. The media operations manager 122 receives configuration data from the host system 120 and stores the configuration data in the configuration data 220.

The configuration data 220 can store a map that identifies which sets of memory components 112A to 112N are used to implement different RGs. For example, the configuration data 220 can store a map that associates a first RG with a first portion of the memory components 112A to 112N (e.g., a first die) and that associates a second RG with a second portion of the memory components 112A to 112N (e.g., a second die). Namely, the map can store an indication of the physical addresses or LUN of the first portion of the memory components 112A to 112N associated with the first RG and an indication of the physical addresses or LUN of the second portion of the memory components 112A to 112N associated with the second RG. The map stored in the configuration data 220 can also be dynamically updated to indicate and track the PEC and/or wear (e.g., PE cycles) of each RG.

Figure 3:
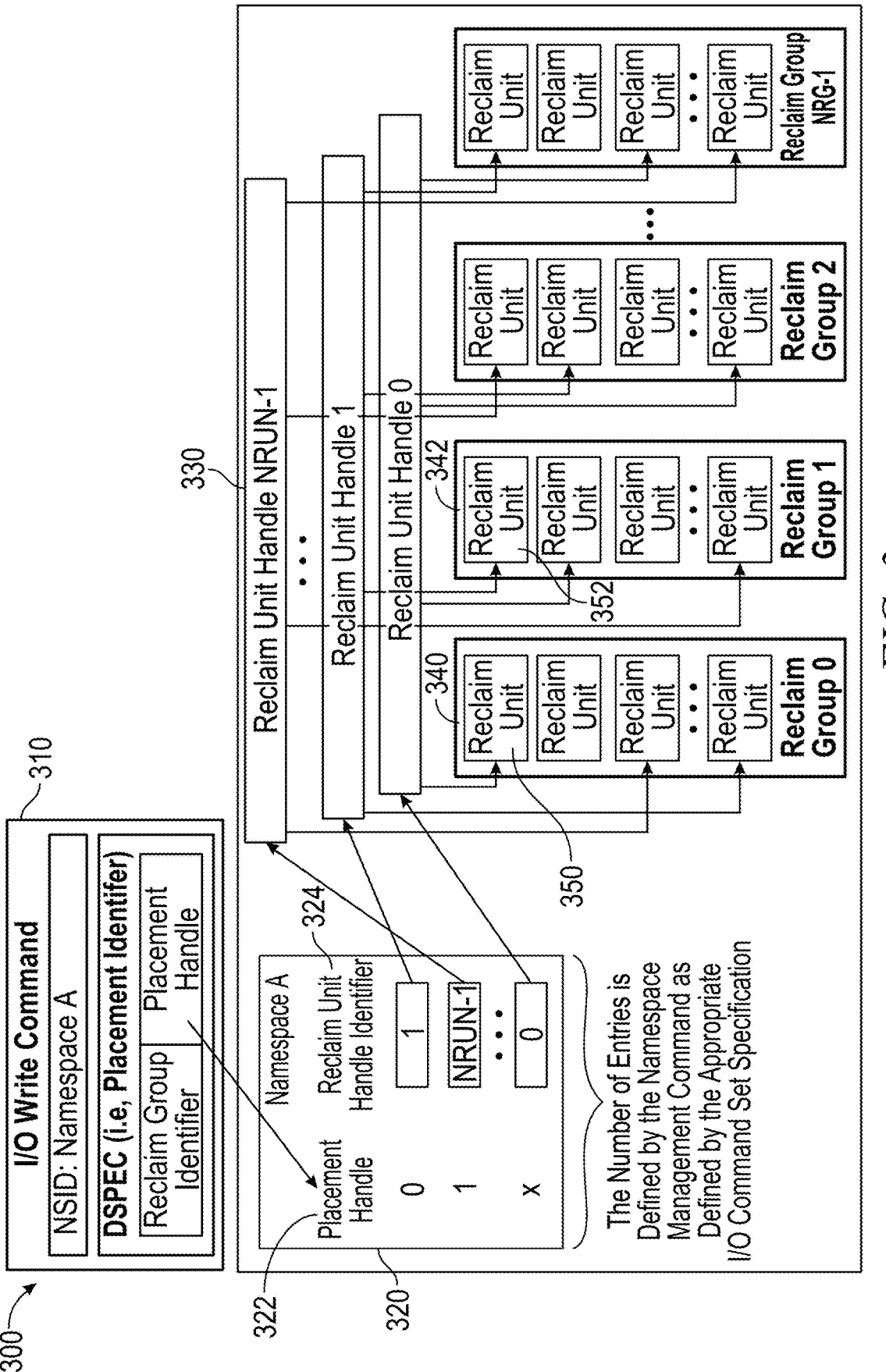
FIG. 3 is a block diagram of an example RG system implementation of the memory sub-system, in accordance with some implementations of the present disclosure.

For example, FIG. 3 is a block diagram of an example RG system 300 implementation of the memory sub-system 110. The RG system 300 includes a placement handle component 320 that is used to store the map of different groups (e.g., the map stored by the configuration data 220). The RG system 300 can receive a write command 310 that specifies at least a RG and/or a placement handle. The placement handle component 320 can search the map using the placement handle 322 to identify the RU 324 associated with the specified RG. The RG system 300 can then generate a write pointer 330 to write data to the identified RU 324.

As shown in FIG. 3, multiple RGs are defined. For example, the RG system 300 includes a first RG 340 and a second RG 342. The first RG 340 includes a first group of RUs 350. The second RG 342 includes a second group of RUs 352. In some cases, the first RG 340 can represent a single memory die and the second RG 342 represents another single memory die. Each RU in the first group of RUs 350 is implemented by a portion of the memory components 112A to 112N, such as blocks, planes, super-blocks, pages, and so forth. Similarly, each RU in the second group of RUs 350 is implemented by a different portion of the memory components 112A to 112N, such as blocks, planes, superblocks, pages, and so forth. All of the garbage collection operations performed within RUs of an individual RG are constrained to that individual RG. For example, garbage collection operations performed on an individual RU of the first group of RUs 350 fold data using only the RUs in the first group of RUs 350 and garbage collection operations performed on an individual RU of the second group of RUs 352 fold data using only the RUs in the second group of RUs 352.

Referring back to FIG. 2, the wear management component 230 can access the configuration data 220 to determine the relative wear and/or PEC of each RG. For example, the wear management component 230 can determine that the PEC of a first RG is greater than the PEC of a second RG. The wear management component 230 can compute a difference between the PEC of the first RG and the PEC of the second RG. The wear management component 230 can determine if that difference transgresses a threshold. In response to determining that the difference transgresses the threshold, the wear management component 230 communicates with the RG management component 240 to reallocate and regroup the assignments between memory components 112A to 112N and RGs.

In some examples, the RG management component 240 can identify the first portion of the memory components 112A to 112N that is currently associated with and used to implement the first RG, such as by accessing the configuration data 220. Similarly, the RG management component 240 can identify the second portion of the memory components 112A to 112N that is currently associated with and used to implement the second RG, such as by accessing the configuration data 220. In response to determining that the first RG has a higher PEC than the second RG by more than the threshold, the RG management component 240 can update the table stored in the configuration data 220 to associate the second portion of the memory components 112A to 112N with the first RG instead of being associated with the second RG. The RG management component 240 can update the table stored in the configuration data 220 to associate the first portion of the memory components 112A to 112N with the second RG instead of being associated with the first RG. In this way, any data that is requested to be programmed into the first RG will be directed to and programmed into the second portion of the memory components 112A to 112N instead of the first portion. This allows the RG management component 240 to control the rate at which different portions of the memory components 112A to 112N are programmed. Namely, the RG management component 240 can balance the load on the memory components 112A to 112N, such that when one portion of the memory components 112A to 112N is programmed more often than another portion (e.g., based on a difference between their respective PECs), the RG management component 240 directs further programming operations to the portion that has a lower rate of being programmed.

The host system 120 continues to specify data to be programmed to an individual RG, such as the first RG and may not be aware of the fact that a different group of memory components 112A to 112N are being used to store the data. In some cases, in the process of regrouping the assignments between memory components 112A to 112N and RGs, the RG management component 240 can copy over all of the data stored in the first portion of the memory components 112A to 112N to the second portion of the memory components 112A to 112N and vice versa. In this way, write operations that are performed at a higher rate for the first RG relative to the second RG can be directed to other memory components 112A to 112N that are associated with lower PEC.

FIG. 4 is a block diagram 400 of an example of RG wear leveling operations, in accordance with some implementations of the present disclosure. The block diagram 400 shows a first RG 410, a second RG 420, and a third RG 430. The first RG 410 can correspond to the first RG 340 (of FIG. 3) and the second RG 420 can correspond to the second RG 342 (of FIG. 3).

As shown in FIG. 4, the wear management component 230 can determine that the PEC of the first RG 410 is a first value (e.g., 7 k), the PEC of the second RG 420 is a second value (e.g., 10 k), and the PEC of the third RG 430 is a third value (e.g., 7 k). The wear management component 230 can compute a difference between the PEC of the second RG 420 and the PEC of the first RG 410. The wear management component 230 can also compute an average of all of the PECs of all of the RGs and can compare the PEC of each RG to the computed average. The wear management component 230 can determine that a difference between the PEC of the second RG 420 and the average PEC and/or the PEC of the first RG 410 transgresses a threshold. In such cases, the wear management component 230 instructs the RG management component 240 to re-group the assignments of the portions of the memory components 112A to 112N to RGs.

In some examples, the RG management component 240 can identify a set of LUNs that correspond to and are used to store data for the first RG 410. Similarly, the RG management component 240 can identify a set of LUNs that correspond to and are used to store data for the second RG 420. As shown in the table 440, the RG management component 240 identifies the set of LUNs 442 associated with the first RG 410 and the set of LUNs 446 associated with the second RG 420. The RG management component 240, in order to balance the wear on the memory components 112A to 112N, can remap the set of LUNs 446 to be associated with the first RG 410 and the set of LUNs 442 to be associated with the second RG 420. As shown in the table 440, after remapping and regrouping the associations between some of the RGs and some of the memory components 112A to 112N, the first RG 410 is now associated with the set of LUNs 444 previously associated with the second RG 420. Also, the second RG 420 is now associated with the set of LUNs 448 previously associated with the first RG 410. The RG management component 240 can prevent or not modify any associations of other RGs. For example, the RG management component 240 can keep the association between a set of LUNs 449 and the third RG 430 while changing the association between the sets of LUNs and the first RG 410 and the second RG 420.

Referring back to FIG. 2, the wear management component 230 can access the configuration data 220 to determine the relative wear and/or PEC of each RG. For example, the wear management component 230 can determine that the PEC (e.g., wear) of a first RG is greater than the PEC (e.g., wear) of a second RG. Namely, the wear management component 230 can determine that a first portion of the memory components 112A to 112N (corresponding to the first RG) are exposed to a greater number of program erase cycles than a second portion of the memory components 112A to 112N (corresponding to the second RG). In such cases, the wear management component 230 can communicate with the RG management component 240 to even out the wear across the RGs. To do so, in some cases, the RG management component 240 can expand or increase the size of one or more RUs of the first RG, such as by borrowing a portion of one or more RUs of other RGs (e.g., the second RG).

In some cases, these borrowed portions are referred to as donated portions of the RUs. By increasing the size of the RU of the first RG, the frequency and rate at which the RUs of the first RG are exposed to PEC is reduced. This is because a greater amount of data can be programmed into an individual RU before that RU is closed and needs to be exposed to a PEC, such as for garbage collection. Consequently, by decreasing the size of one or more RUs of a second RG, the frequency and rate at which the RUs of the second RG are exposed to PEC is increased. This is because less amount of data can be programmed into an individual RU before that RU is closed and needs to be exposed to a PEC, such as for garbage collection. In this way, after a certain number of program operations, the RGs will reach matching PECs. Once the RGs reach matching PECs and/or when a difference between the PECs of the different RGs is below a threshold, the RG management component 240 can return the donated portions of the RU back to the RU from which they were borrowed.

In some examples, each RG maintains a pool of blocks, pages, superblocks, and/or portions of the memory components 112A to 112N that belong or are used to implement individual RUs in which data has not been programmed. These portions of the RUs can be collected into a free pool (e.g., a queue) of RU portions. When the RG management component 240 determines there exists a need to expand a size of an individual RU of an individual RG, the RG management component 240 can access the pool of RU portions and select one or more portions from the free pool. Once a portion of the RU is selected from the pool, a table is updated to store which portions of the RU have been donated to other RUs of other RGs. Using this table, the RG management component 240 can perform garbage collection operations on the various RGs using only the portions of the RUs that are still allocated to the respective RGs. For example, the RG management component 240 can perform garbage collection operations on the second RG using the RUs associated to the second RG and excluding one or more portions of those RUs that have been donated (as specified in the table) to the first RG. Similarly, the RG management component 240 can perform garbage collection operations on the first RG using the RUs associated to the second RG and including one or more portions of RUs that have been donated (as specified in the table) to the first RG from the second RG.

In some examples, the RG management component 240 can determine the size of the portion of the RUs that are donated to expand the size of an individual RU of a given RG based on a target PEC. For example, the RG management component 240 can determine the size of the portion and compute the target PEC in accordance with the following Equation:

$$HWCP+TRSPEC*HWWA=(HWPC/LWPC)*(LWWS/HWWS)*LWWA*TRSPEC+LWCP, \text{ where}$$

HWCP represents a current PEC of a high-wearing die, TRSPEC represents the PEC required to transition from large wear gap to almost 0 gap, HWWA represents the write amplification (WA) in high-wearing die, HWPC represents the needed adaptive plane count of an RU in a high-wearing die, LWPC represents the adaptive plane count of an RU in a low-wearing die, LWWS represents the host writing speed in the low-wearing die, HWWS represents the host writing speed in the high-wearing die, LWWA represents the WA in the low-wearing die, LWCP represents the current PEC of the low-wearing die. In cases where the WR=HWCP-LWCP, the Equation can be rewritten as:

$$WR + TRSPEC*HWWA = (HWPC/LWPC)*(LWWS/HWWS)*$$
$$LWWA*TRSPEC$$

which can further be simplified as: WR=((HWPC/LWPC)* (LWWS/HWWS)*LWWA–HWWA)*TRSPEC In some cases, the WA between each die is even, in which case LWWA=HWWA. In such cases, the equation can be simplified as: HWPC/LWPC=(WR/(HWWA*TRSPEC))+1.

Figure 5:
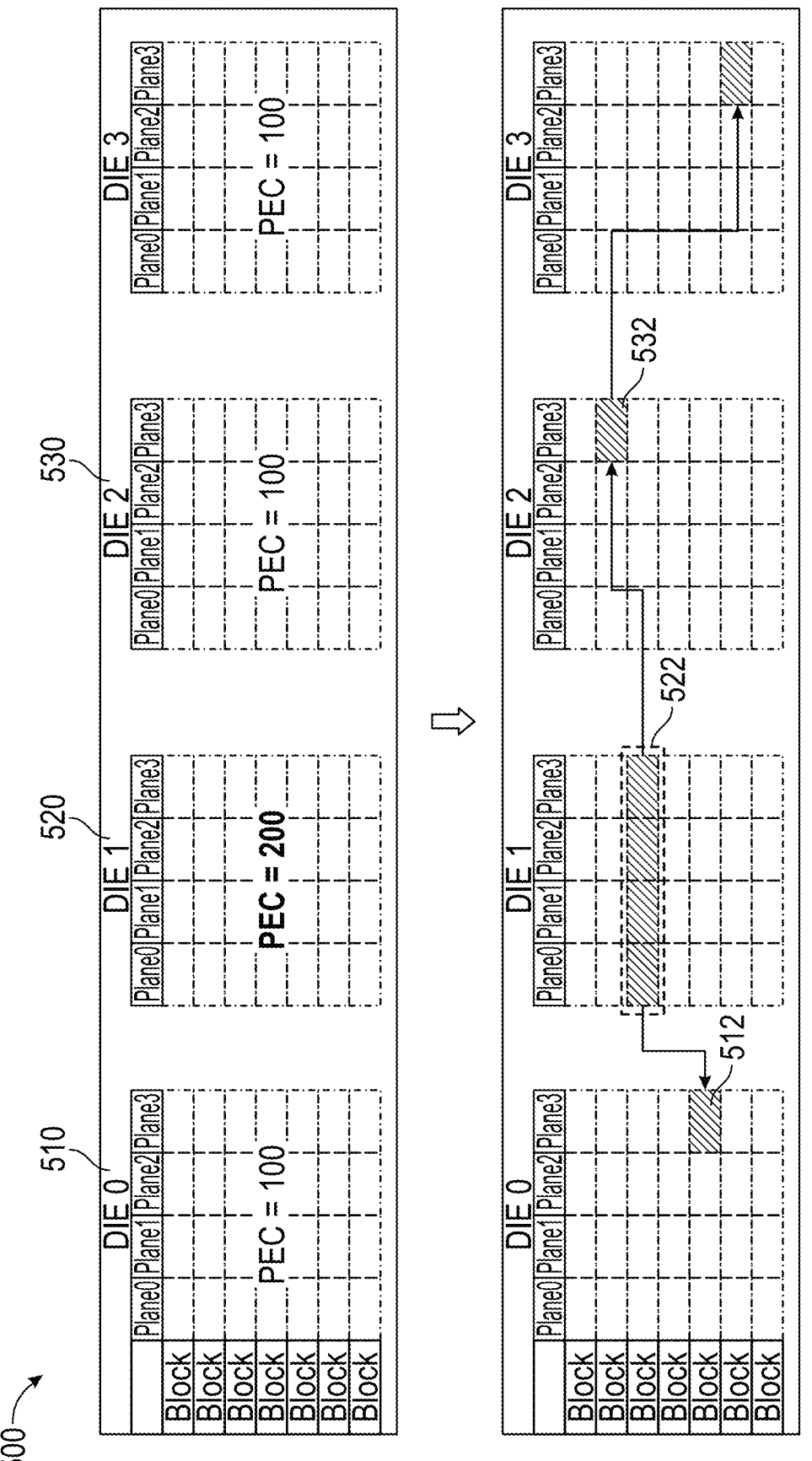

FIG. 5 is a block diagram 500 of an example of RG wear leveling operations, in accordance with some implementations of the present disclosure. The block diagram 500 shows a first RG 510, a second RG 520, and a third RG 530. The first RG 510 can correspond to the first RG 340 (of FIG. 3) and the second RG 520 can correspond to the second RG 342 (of FIG. 3).

As shown in FIG. 5, the wear management component 230 can determine that the PEC of the first RG 510 is a first value (e.g., 100), the PEC of the second RG 520 is a second value (e.g., 200), and the PEC of the third RG 530 is a third value (e.g., 100). The wear management component 230 can compute the target PEC to balance the PECs across the first RG 510, the second RG 520, and the third RG 530, such as based on the above Equation(s). The wear management component 230 can instruct the RG management component 240 to perform balancing operations according to the target PEC by expanding or increasing the size of one or more RUs of the second RG 520.

In some examples, a first RU of the first RG 510 can be implemented by a plurality of blocks across multiple planes (e.g., plane0, plane1, plane2, and plane3). Similarly, a second RU 522 of the second RG 520 can be implemented by a plurality of blocks across multiple planes (e.g., plane0, plane1, plane2, and plane3). A third RU of the third RG 530 can be implemented by a plurality of blocks across multiple planes (e.g., plane0, plane1, plane2, and plane3). The RG management component 240 can select a first block 512 of an individual plane (e.g., plane3) from the first RG 510 to donate to the second RU 522 of the second RG 520. This expands the size of the second RU 552 by one block. The RG management component 240 can select a second block 532 of an individual plane (e.g., plane3) from the third RG 530 to donate to the second RU 522 of the second RG 520. This expands the size of the second RU 522 by another block. By donating the two blocks to the second RU 522, the size of the second RU 522 becomes six blocks instead of four. After the RG management component 240 determines that the PECs of the first RG 510, the second RG 520, and the third RG 530 match or are within a threshold difference of each other, the RG management component 240 can return the first block 512 back to the RU of the first RG 510 and return the second block 532 back to the RU of the third RG 530. This shrinks or reduces the size of the second RU 522 back to the default configuration size of, for example, four blocks.

While the first block 512 is being borrowed by the second RU 522, garbage collection operations performed on the RU of the first RG 510 that originally had the first block 512 can be performed on only the remaining blocks of the RU of the first RG 510. For example, garbage collection operations can be performed on the three blocks from the plane0, plane1, and plane2 and exclude being performed on the first block 512. While the first block 512 is being borrowed by the second RU 522, garbage collection operations performed on the second RU 522 can be performed on all the blocks of the second RU 522 and on the first block 512 and the second block 532 that have been borrowed from the first RG 510 and the third RG 530, respectively.

FIG. 6 is a flow diagram of an example method 600 to RG balancing operations, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to FIG. 6, the method (or process) 600 begins at operation 605, with a media operations manager 122 of a memory sub-system (e.g., memory sub-system 110) grouping the set of memory components into a plurality of RG, each RG of the plurality of RGs comprising a subset of RUs. Then, at operation 610, the media operations manager 122 of the memory sub-system receives a request to program a set of data into a first RG of the plurality of RGs. Thereafter, at operation 615, the media operations manager 122 compares a first PEC of the first RG with a second PEC of a second RG of the plurality of RGs. The media operations manager 122, at operation 620, performs wear leveling operations as a function of the set of data requested to be programmed into the first RG using one or more memory components associated with the second RG based on a result of comparing the first PEC of the first RG with the second PEC of the second RG.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: grouping the set of memory components into a plurality of reclaim groups (RGs), each RG of the plurality of RGs comprising a subset of reclaim units (RUs); receiving a request to program a set of data into a first RG of the plurality of RGs; comparing a first program-erase count (PEC) of the first RG with a second PEC of a second RG of the plurality of RGs; and performing wear leveling operations for the set of data requested to be programmed into the first RG using one or more memory components associated with the second RG based on a result of comparing the first PEC of the first RG with the second PEC of the second RG.

Example 2. The system of Example 1, wherein the memory sub-system includes FDP.

Example 3. The system of any one of Examples 1-2, the operations comprising: maintaining a table that stores a current PEC of each of the plurality of RGs, the first PEC being stored in the table in association with the first RG and the second PEC being stored in the table in association with the second RG.

Example 4. The system of any one of Examples 1-3, the wear leveling operations comprising: programming the set of data requested to be programmed into the first RG into the one or more memory components associated with the second RG.

Example 5. The system of Example 4, the operations comprising: regrouping at least a portion of the set of memory components based on the result of comparing the first PEC of the first RG with the second PEC of the second RG.

Example 6. The system of Example 5, the operations comprising: determining that a first group of the set of memory components is associated with the first RG; determining that a second group of the set of memory components is associated with the second RG; and modifying association between the first group of the set of memory components and the first RG to associate the second group of the set of memory components with the first RG.

Example 7. The system of Example 6, the operations comprising: modifying association between the second group of the set of memory components and the second RG to associate the first group of the set of memory components with the second RG; and maintaining association between a third group of the set of memory components with a third RG of the plurality of RGs.

Example 8. The system of any one of Examples 6-7, the operations comprising: programming the set of data requested to be programmed into the first RG into the second group of the set of memory components instead of the first group of the set of memory components.

Example 9. The system of any one of Examples 5-8, the operations comprising: determining that a difference between the first PEC of the first RG and the second PEC of the second RG transgresses a threshold; and initiating the regrouping of the at least the portion of the set of memory components in response to determining that the difference between the first PEC of the first RG and the second PEC of the second RG transgresses the threshold.

Example 10. The system of any one of Examples 1-9, the operations comprising: determining that a first group of the set of memory components associated with the first RG has higher wearing than a second group of the set of memory components associated with the second RG based on the result of comparing the first PEC of the first RG with the second PEC of the second RG; defining the first RG as a high-wearing RG and the second RG as a low-wearing RG in response to determining that the first group of the set of memory components associated with the first RG has higher wearing than the second group of the set of memory components associated with the second RG; and enlarging a size of an individual RU of the subset of RUs of the first RG by donating a portion of a second RU of the subset of RUs of the second RG to the individual RU.

Example 11. The system of Example 10, wherein the individual RU comprises a first set of planes of a first die, wherein the second RU comprises a second set of planes of a second die, the operations comprising: associating a block of an individual plane of the second set of planes with the individual RU to increase a quantity of blocks associated with the individual RU, wherein the second RU comprises blocks of a subset of the second set of planes that is fewer in quantity as a result of associating the block of the individual plane of the second set of planes with the individual RU.

Example 12. The system of Example 11, the operations comprising: after associating the block of an individual plane of the second set of planes with the individual RU to increase the quantity of blocks associated with the individual RU, determining that wear of the first RG matches wear of the second RG; and in response to determining that the wear of the first RG matches the wear of the second RG, reducing the size of the individual RU by re-associating the block of the individual plane with the second RU.

Example 13. The system of any one of Examples 10-12, the operations comprising: maintaining a tracking table that identifies the donated portion of the second RU; and removing the donated portion from the tracking table in response to determining that wear of the first RG matches wear of the second RG.

Example 14. The system of any one of Examples 10-13, the operations comprising: while the donated portion of the second RU continues to be donated to the first RG, performing garbage collection operations on the second RG excluding the donated portion; and performing garbage collection operations on the first RG including the donated portion of the second RU.

Example 15. The system of Example 14, the garbage collection operations comprising: folding valid data from one or more RUs of the first RG to one or more other RUs of the first RG.

Example 16. The system of any one of Examples 10-15, wherein the operations comprise: selecting a size of the donated portion of the second RG; and computing, based on the selected size, a target PEC representing a quantity of PECs needed to complete balancing PEC values of the first RG with the PEC values of the second RG.

Example 17. The system of any one of Examples 10-16, wherein the operations comprise: maintaining a queue of available blocks from the low-wearing RG available for use in expanding RUs of the high-wearing RG.

Example 18. The system of any one of Examples 1-17, wherein each RG is associated with a different die of a plurality of dies of the memory sub-system.

Methods and computer-readable storage medium with instructions for performing any one of the above Examples.

Figure 7:
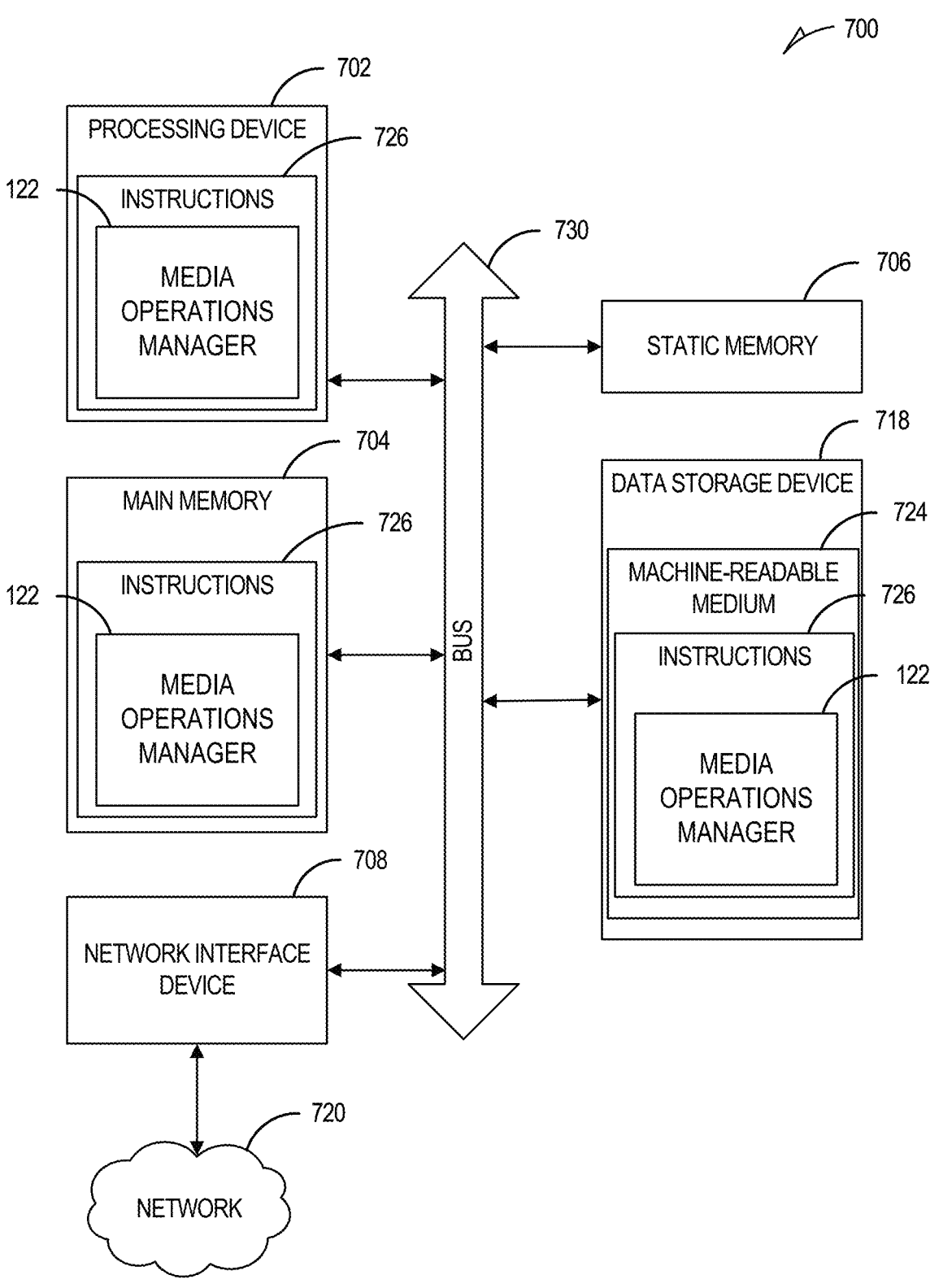
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 implement functionality corresponding to the media operations manager 122 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:

a set of memory components of a memory sub-system; and at least one processing device operatively coupled to the set of memory components, the at least one processing device being configured to perform operations comprising:

grouping the set of memory components into a plurality of reclaim groups (RGs), each RG of the plurality of RGs comprising a subset of reclaim units (RUs);

receiving, from a host system, a request to program a set of data into a first RG of the plurality of RGs, the request specifying the first RG of the plurality of RGs in which to program the set of data;

comparing a first program-erase count (PEC) of the first RG with a second PEC of a second RG of the plurality of RGs;

performing wear leveling operations for the set of data requested to be programmed into the first RG using one or more memory components associated with the second RG based on a result of comparing the first PEC of the first RG with the second PEC of the second RG;

based on performing the wear leveling operation, programming the set of data into one or more of the subset of RUs of the second RG instead of the subset of RUs of the first RG specified in the request from the host system;

wherein the operations comprise:

enlarging a size of an individual RU of the subset of RUs of the first RG by donating a portion of a second RU of the subset of RUs of the second RG to the individual RU.

2. The system of claim 1, wherein the memory sub-system includes Flexible Data Placement (FDP).

3. The system of claim 1, the operations comprising:

maintaining a table that stores a current PEC of each of the plurality of RGs, the first PEC being stored in the table in association with the first RG and the second PEC being stored in the table in association with the second RG.

4. The system of claim 1, the wear leveling operations comprising:

programming the set of data requested to be programmed into the first RG into the one or more memory components associated with the second RG.

5. The system of claim 4, the operations comprising:

regrouping at least a portion of the set of memory components based on the result of comparing the first PEC of the first RG with the second PEC of the second RG.

6. The system of claim 5, the operations comprising:

determining that a first group of the set of memory components is associated with the first RG;

determining that a second group of the set of memory components is associated with the second RG; and modifying association between the first group of the set of memory components and the first RG to associate the second group of the set of memory components with the first RG.

7. The system of claim 6, the operations comprising:

modifying association between the second group of the set of memory components and the second RG to associate the first group of the set of memory components with the second RG; and maintaining association between a third group of the set of memory components with a third RG of the plurality of RGs.

8. The system of claim 6, the operations comprising:

programming the set of data requested to be programmed into the first RG into the second group of the set of memory components instead of the first group of the set of memory components.

9. The system of claim 5, the operations comprising:

determining that a difference between the first PEC of the first RG and the second PEC of the second RG transgresses a threshold; and initiating the regrouping of the at least the portion of the set of memory components in response to determining that the difference between the first PEC of the first RG and the second PEC of the second RG transgresses the threshold.

10. The system of claim 1, the operations comprising:

determining that a first group of the set of memory components associated with the first RG has higher wearing than a second group of the set of memory components associated with the second RG based on the result of comparing the first PEC of the first RG with the second PEC of the second RG;

defining the first RG as a high-wearing RG and the second RG as a low-wearing RG in response to determining that the first group of the set of memory components associated with the first RG has higher wearing than the second group of the set of memory components associated with the second RG; and enlarging a size of an individual RU of the subset of RUs of the first RG by donating a portion of a second RU of the subset of RUs of the second RG to the individual RU.

11. The system of claim 10, wherein the individual RU comprises a first set of planes of a first die, wherein the second RU comprises a second set of planes of a second die, the operations comprising:

associating a block of an individual plane of the second set of planes with the individual RU to increase a quantity of blocks associated with the individual RU, wherein the second RU comprises blocks of a subset of the second set of planes that is fewer in quantity as a result of associating the block of the individual plane of the second set of planes with the individual RU.

12. The system of claim 11, the operations comprising:

after associating the block of an individual plane of the second set of planes with the individual RU to increase the quantity of blocks associated with the individual RU, determining that wear of the first RG matches wear of the second RG; and in response to determining that the wear of the first RG matches the wear of the second RG, reducing the size of the individual RU by re-associating the block of the individual plane with the second RU.

13. The system of claim 10, the operations comprising:

maintaining a tracking table that identifies the donated portion of the second RU; and removing the donated portion from the tracking table in response to determining that wear of the first RG matches wear of the second RG.

14. The system of claim 10, the operations comprising:

while the donated portion of the second RU continues to be donated to the first RG, performing garbage collection operations on the second RG excluding the donated portion; and performing garbage collection operations on the first RG including the donated portion of the second RU.

15. The system of claim 14, the garbage collection operations comprising:

folding valid data from one or more RUs of the first RG to one or more other RUs of the first RG.

16. The system of claim 10, wherein the operations comprise:

selecting a size of the donated portion of the second RG; and computing, based on the selected size, a target PEC representing a quantity of PECs needed to complete balancing PEC values of the first RG with the PEC values of the second RG.

17. The system of claim 10, wherein the operations comprise:

maintaining a queue of available blocks from the low-wearing RG available for use in expanding RUs of the high-wearing RG.

18. A method comprising:

grouping a set of memory components into a plurality of reclaim groups (RGs), each RG of the plurality of RGs comprising a subset of reclaim units (RUs);

receiving, from a host system, a request to program a set of data into a first RG of the plurality of RGs, the request specifying the first RG of the plurality of RGs in which to program the set of data;

comparing a first program-erase count (PEC) of the first RG with a second PEC of a second RG of the plurality of RGs;

performing wear leveling operations for the set of data requested to be programmed into the first RG using one or more memory components associated with the second RG based on a result of comparing the first PEC of the first RG with the second PEC of the second RG;

based on performing the wear leveling operation, programming the set of data into one or more of the subset of RUs of the second RG instead of the subset of RUs of the first RG specified in the request from the host system;

wherein the operations comprise:

enlarging a size of an individual RU of the subset of RUs of the first RG by donating a portion of a second RU of the subset of RUs of the second RG to the individual RU.

19. A non-transitory computer-readable storage medium comprising instructions that, when executed by at least one processing device, cause the at least one processing device to perform operations comprising:

grouping a set of memory components into a plurality of reclaim groups (RGs), each RG of the plurality of RGs comprising a subset of reclaim units (RUs);

receiving, from a host system, a request to program a set of data into a first RG of the plurality of RGs, the request specifying the first RG of the plurality of RGs in which to program the set of data;

comparing a first program-erase count (PEC) of the first RG with a second PEC of a second RG of the plurality of RGs;

performing wear leveling operations for the set of data requested to be programmed into the first RG using one or more memory components associated with the second RG based on a result of comparing the first PEC of the first RG with the second PEC of the second RG;

based on performing the wear leveling operation, programming the set of data into one or more of the subset of RUs of the second RG instead of the subset of RUs of the first RG specified in the request from the host system;

wherein the operations comprise:

enlarging a size of an individual RU of the subset of RUs of the first RG by donating a portion of a second RU of the subset of RUs of the second RG to the individual RU.

* * * * *